Nov. 7, 1967          P. E. KITE          3,351,158
LOCKING DEVICE FOR FLEXIBLE MEMBER
Filed June 20, 1966          3 Sheets-Sheet 1
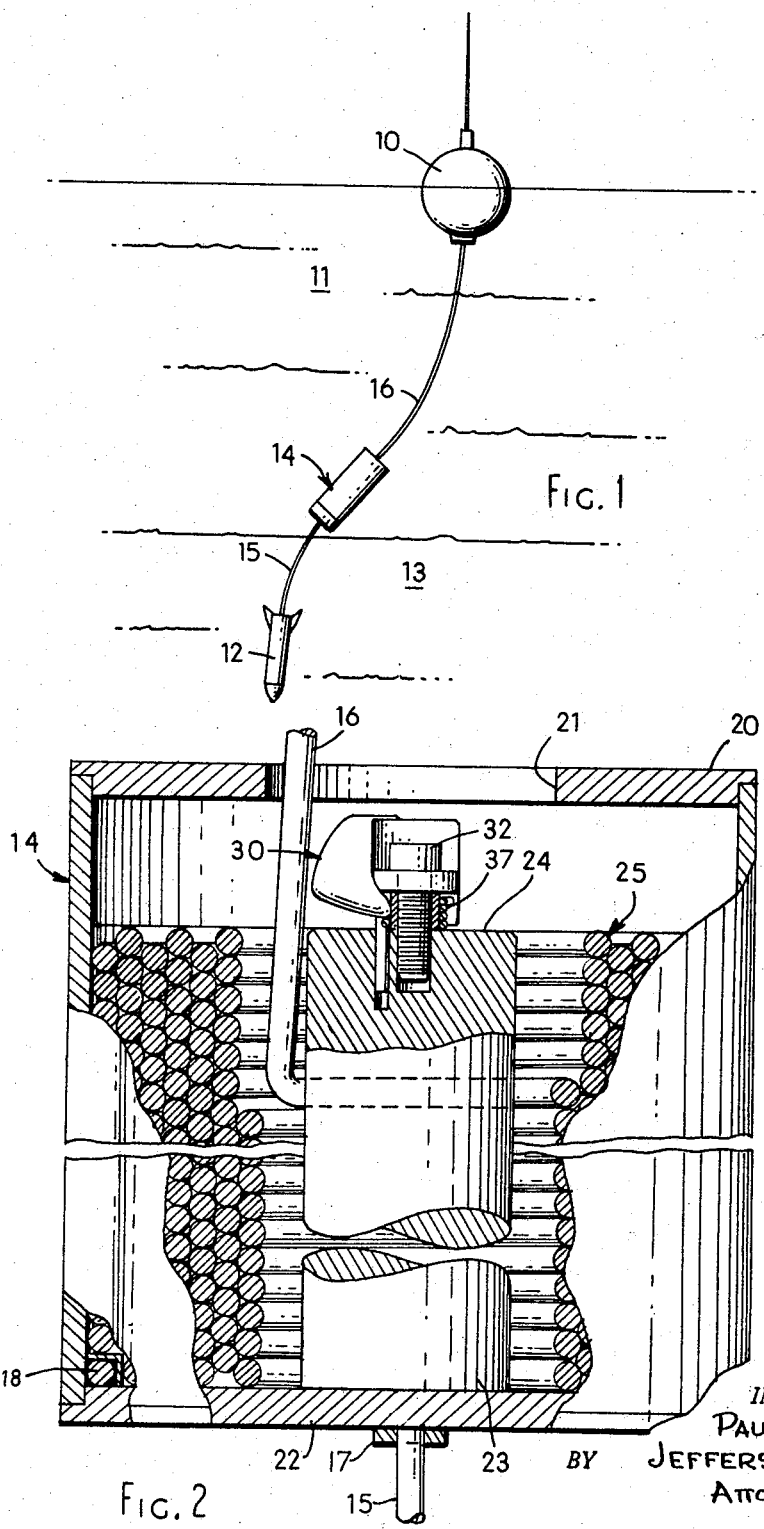
INVENTOR.
PAUL E. KITE
BY JEFFERS & YOUNG
ATTORNEYS

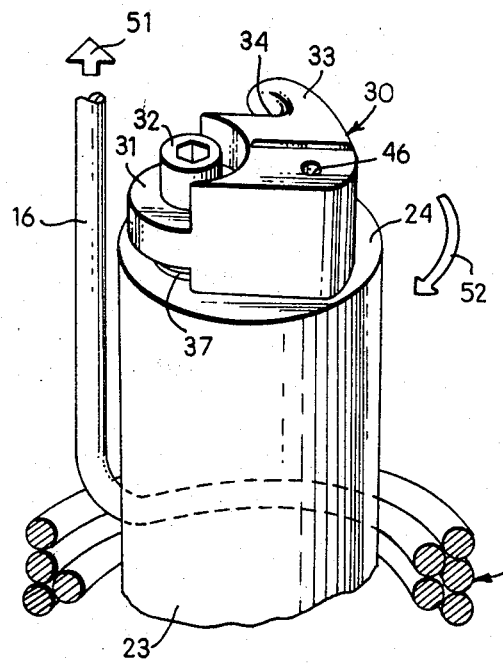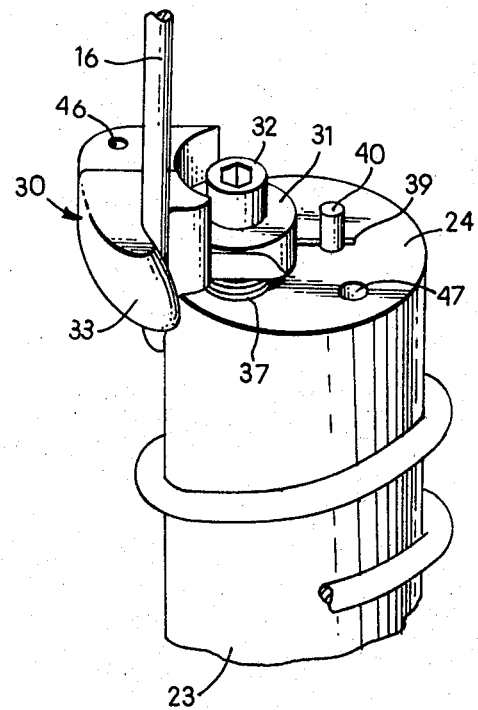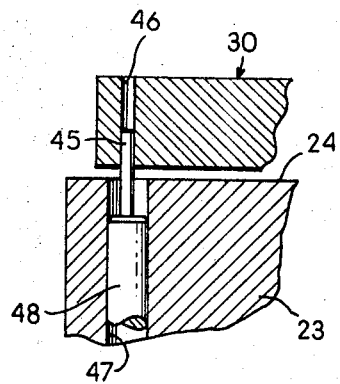

United States Patent Office 3,351,158
Patented Nov. 7, 1967

3,351,158
LOCKING DEVICE FOR FLEXIBLE MEMBER
Paul E. Kite, South Whitley, Ind., assignor, by mesne assignments, to the United States of America as represented by the Secretary of the Navy
Filed June 20, 1966, Ser. No. 558,777
5 Claims. (Cl. 188—65.4)

My invention relates to an improved locking device for a flexible member, and particularly to such a device for a coiled cable.

A container of coiled cable which may include single or multi-strand wire or rope, is used in many applications to provide a relatively compact but readily available supply of cable. The cable is unwound or withdrawn or paid out from the interior of its coil until the desired length of cable has been withdrawn. After the desired length of cable has been withdrawn, it may be desirable to lock the cable so that no additional length can be withdrawn. One improved device for permitting the desired length of cable to be withdrawn and then locked is described in the copending application entitled, "Cable Dispensing and Locking Means," filed Jan. 19, 1966, Ser. No. 521,654. The device described in that copending application comprises a generally cylindrical core associated with a coil of cable. The core may be spaced from the coil or may be in contact with the coil. In either case, the cable coil is fixed with respect to the core. As the cable is withdrawn from the cable coil, it is dispensed outwardly in a direction which is generally parallel to the axis of the core. Such withdrawal of the cable causes each turn of cable to revolve about the periphery of the core as it unwinds from the cable coil. As long as the unwinding turns of cable are allowed to revolve freely and unimpeded about the core, the cable withdrawal can continue. However, when this cable motion or revolving about the core is obstructed or restricted, further withdrawal of the cable from the cable coil will cause the turns of cable to wind themselves around and on the outer periphery of the core. Eventually, the cable will be wound with enough turns and tightly enough so that the friction between the cable and core will stop further unwinding and withdrawal of the cable from the cable coil.

A typical restricting device of the invention of the copending application uses a disc or rotary member rotatably mounted on the core for rotation with respect to the coil or core. The disc has a notch or an aperture therein through which the free end of the cable passes. The disc is rotated by the unwinding of the turns of the coil and by passage of the cable through the aperture or notch in the disc. If unwinding or paying out of the cable is to be stopped, means are provided to stop rotation of the disc. With the disc stopped, the additional unwinding of the turns of the cable about the core cause subsequent turns of the unwinding cable to wrap themselves tightly about the core. Eventually, usually after a few turns, there will be enough friction developed between the turns and core so that further withdrawal of the cable is stopped.

The invention as described in the copending application operates well in many applications. Accordingly, the main object of my invention is to provide a new and improved locking device for a flexible member or cable.

Another object of my invention is to provide a cable locking device which permits access to the cable coil from the free end of the core.

Another object of my invention is to permit withdrawal or pay out of cable with relatively little friction because the cable need not pass through a disc hole or aperture prior to the disc being locked to lock the cable.

Another object of my invention is to permit withdrawal or pay out of cable even when two or more turns of cable are removed at the same time, since there is no small restricting hole or aperture which might block a kink in the cable caused by removal of two or more turns.

Briefly, these and other objects are achieved in accordance with my invention with a container which holds or contains the wound or coiled supply of cable. One end of an elongated core is mounted on the container inside or within the wound cable. A locking piece in accordance with the invention is mounted on the other or free end of the core which the cable passes when being withdrawn. In a preferred embodiment, the locking piece has a pivot portion and a stopping portion shaped to generally resemble a hook or bent arm. The pivot portion is pivotally fastened to the free end of the core. The locking piece is dimensioned so that it may be positioned to leave the core periphery and surrounding area unobstructed, thus permitting the cable to be withdrawn from the interior of the coil and along the core. Such withdrawal causes the uncoiling turns tof the cable to revolve about the outer periphery of the core. After the desired amount of cable has been withdrawn, the locking piece is pivoted so that its bent end forms an obstruction which restricts the free movement of the cable about the core's periphery. This obstruction causes subsequent uncoiling turns of the cable to wind themselves on the core as further cable is withdrawn. Each uncoiling turn of the cable is thus wrapped or drawn tightly on the core as withdrawal continues. After a few such turns, the friction between the cable and core stops further cable withdrawal and thus terminates the cable pay out. The shape or position of the locking piece may be varied to some extent to provide locking for either direction of unwinding of the cable from the coil.

The subject matter which I regard as my invention is particularly pointed out and distinctly claimed in the claims. The structure and operation of my invention, together with further objects and advantages, may be better understood from the following description given in connection with the accompanying drawing, in which:

FIGURE 1 shows a container for cable which has been withdrawn and locked in accordance with the invention for anchoring a buoy in a body of water;

FIGURE 2 shows a longitudinal view, partly in cross section, of a container of cable having a core and locking piece (positioned to permit withdrawal) in accordance with the invention;

FIGURE 3 shows a perspective view of a core, a portion of a cable being withdrawn and uncoiled, and a locking piece in accordance with the invention positioned to permit withdrawal of the cable;

FIGURE 4 shows a perspective view of a core, a portion of a cable being withdrawn and uncoiled, and a locking piece in accordance with the invention positioned to lock or stop withdrawal of the cable;

Figure 5:
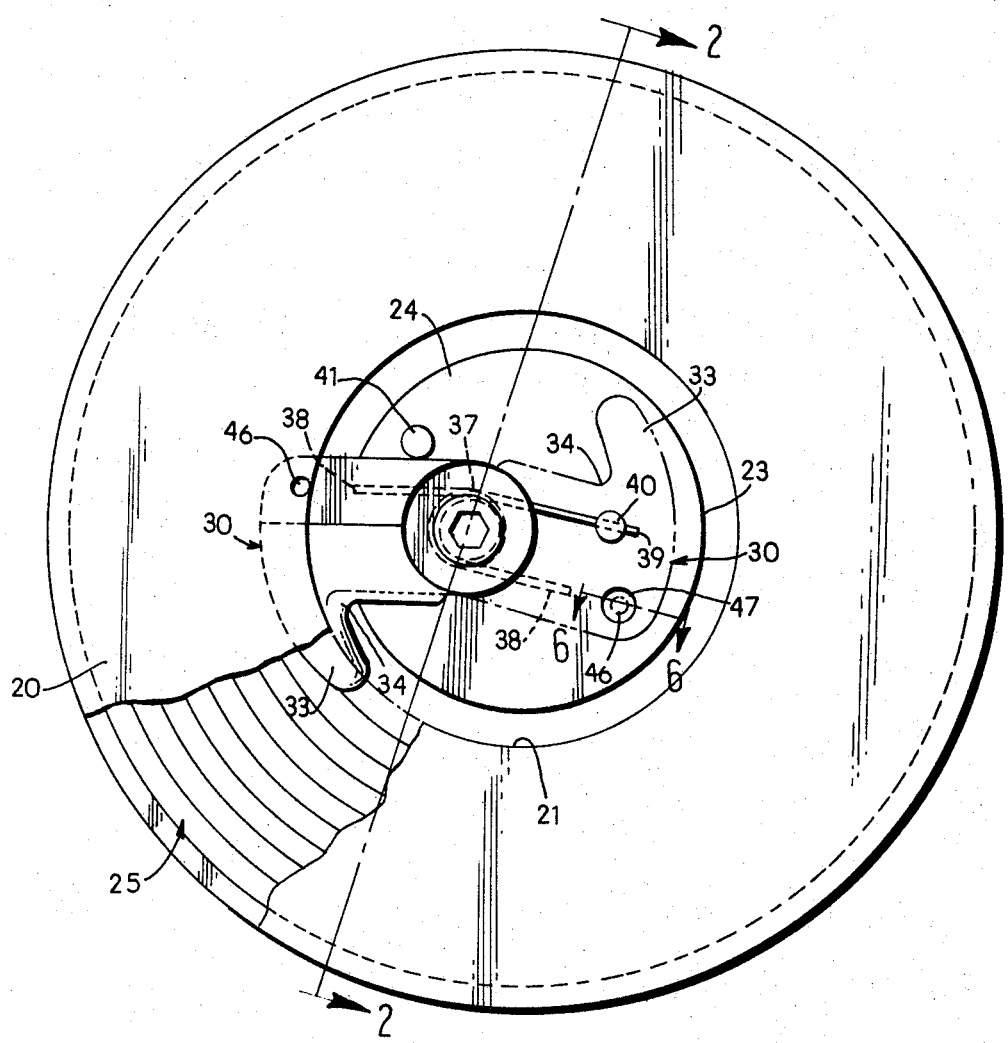
FIGURE 5 shows an end view of the container and core with the locking piece shown in both its unobstructed position and in its locking position; and, FIGURE 6 shows a cross sectional view taken along the lines 6—6 in FIGURE 5 to show how the locking piece may be released.

FIGURE 1 shows one application, by way of example only, of a cable and locking device. In this application, a buoy 10 is placed in a body of water 11 and is to be anchored on the bottom 13 by an anchor 12. The buoy 10 is attached to the anchor 12 through a length of cable 16 stored in a container 14, and through a length of cable or chain 15 connected between the container 14 and the anchor 12. In order that the buoy 10 can remain afloat on the surface of the water 11, it is desirable that the proper length of cable 16 be withdrawn from the container 14 as the container 14 and anchor 12 descend to the bottom 13 and the anchor 12 embeds itself (by any suitable means) in or under the bottom 13. After the desired or proper length of cable 16 has been so withdrawn, the cable 16 should be locked or held so that the remaining cable in the container 14 cannot be withdrawn. Such locking or holding prevents the buoy 10 from drifting or floating away from the location of the container 14 and the anchor 12.

FIGURE 2 shows a longitudinal view, partly in cross section, of the container 14. The container 14 may have any suitable shape, but is preferably a cylindrical can having a circular top 20, with an opening 21 through which the length of cable 16 may be withdrawn, and a circular bottom 22. The length of cable or chain 15 may be attached by a clamp 17 to the bottom 22 for connecting the container 14 to the anchor 12. An elongated, cylindrical, metallic core 23 is centrally positioned inside the container 14 and is attached or fastened to the bottom 22. The core 23 is shorter than the length of the container 14 so that it has a free or upper end 24 which is spaced from the container top 20. The supply of cable is wound or stored in turns or coils 25, with the cable so arranged that the free end or portion of the cable to be withdrawn can be withdrawn from the interior of the coils 25 of the cable. The other end of the cable supply is attached to the container 14 at the point 18. The supply of cable can be so arranged by winding the cable into the coils 25 on a form and cementing the coils 25, and then withdrawing the form to leave the coils 25 in the arrangement shown. A locking piece 30 (shown in a permissive or closed condition in FIGURE 2) and associated structure in accordance with the invention are mounted on or fastened to the free end 24 of the core 23. Or, the piece 30 may be mounted on or fastened to a separate plate (not shown) which in turn is fastened to the free end 24 of the core 23.

FIGURES 3, 4, and 5 show additional views of the core 23 and the locking piece 30. The locking piece 30 generally represents or resembles a hook or elbow having a pivot portion or arm 31 which is pivotally fastened to the free end 24 of the core 23 by suitable means such as a pivot screw 32. The locking piece 30 also includes a locking or stopping arm portion 33 which is attached to or integral with the pivot portion 31 to form a locking notch 34. A torsion or biasing spring 37 is wound about the pivot screw 32, with one end 38 of the spring 37 fitting into an interior bore or hole extending along the pivot portion 31 of the locking piece 30, and with the other end 39 of the spring 37 held or fastened by a spring post 40. The spring 37 is arranged so that it tends to rotate or pivot the locking piece 30 in a clockwise direction as viewed in FIGURE 5. However, the amount of pivoting or rotation of the locking piece 30 is determined by a stop post 41 which is fastened to the free end 24 of the core 23.

The locking piece 30 is maintained in the permissive position shown in FIGURE 3 and in phantom outlines in FIGURE 5 by means of a snugly fitting retaining pin 45. As shown in the cross sectional view of FIGURE 6, this retaining pin 45 extends from a hole or opening 46 in the locking piece 30 down into a correspondingly positioned hole or opening 47 in the free end 24 of the core 23. Thus, the retaining pin 45 prevents the torsion spring 37 from pivoting or rotating the locking piece 30 in a clockwise direction. However, when it is desired to lock the withdrawn cable, a release pin 48 positioned in the hole 47 in the core 23 is driven upward to drive the projecting lower end of the retaining pin 45 into its hole 46 and flush with the lower part of the locking device 30. This frees the locking piece 30 so that the torsion spring 37 can then rotate the locking piece 30 from its permissive position shown in FIGURES 2 and 3 and in phantom lines in FIGURE 5 to the locking position shown in FIGURE 4 and in solid lines in FIGURE 5. The release pin 48 may be actuated in any suitable or desired fashion. For example, the pin 48 may be actuated by an explosive charge or spring that is set off by a pressure sensing device or by a manual device, depending on the application of the cable and container 14.

FIGURES 2 and 3, and the phantom lines in FIGURE 5, show the locking piece 30 positioned to permit the cable length 16 to be withdrawn from its coils 25. With the locking piece 30 in its permissive or unoperated or closed position, the periphery of the core 23 and the surrounding area are free from obstructions. FIGURE 3 shows particularly well how, as the cable length 16 is withdrawn upward as indicated by an arrow 51, the turns are successively removed from the coils 25. As these turns are removed, the cable rotates about the core 23 in the direction indicated by the arrow 52. When the desired length 16 of the cable has been withdrawn in this manner, the release pin 48 is operated upward to drive the retaining pin 45 into its hole 46 so it clears the free end 24. This permits the locking piece 30 to rotate (approximately 180 degrees) in a clockwise direction as viewed in FIGURE 5 until it engages and is stopped by the stop post 41. With respect to FIGURE 4 and the solid lines shown in FIGURE 5, it will be seen that the locking arm 33 and the locking notch 34 are now positioned outside of the periphery of the core 23. Under this condition, as the cable length 16 continues to be withdrawn, the direction of rotation of the withdrawn cable about the core 23 causes the cable 16 to become positioned between the locking arm 33 and the core 23. Thus, continued withdrawal of the cable 16 will cause the succeeding uncoiled turns from the coil 25 to be wound upon the core 23. Still further cable withdrawal in the direction indicated by the arrow 51 of FIGURE 3 causes the previous turns, which were captivated about the core 23 as illustrated in FIGURE 4, to be more tightly wound upon the core 23. This progresses until the friction between these wrapped turns and the core 23 is sufficient to terminate any further unwinding of the cable 16 from the coil 25 and to terminate subsequent withdrawal or paying out of the cable. Thus, the relatively simple and reliable locking piece 30 permits withdrawal of the cable until its retaining pin 45 is moved upward. When this occurs, the locking piece 30 causes the succeeding turns of cable to be wrapped about the core 23 and lock the cable.

The locking piece 30, and particularly its locking arm 33, are shaped and positioned for pivoting so that when in its closed or permissive position, no obstruction extends beyond the periphery of the core 23. The locking piece 30 is further shaped so that when it is in the open or locking position the uncoiling turns of the cable length 16 must and do place themselves in the locking notch 34. The force exerted against the locking piece 30 under this condition is absorbed by the stop post 41. In addition, the locking piece 30 is rounded or smoothed so that when it is pivoted to its open or locking position, it does not chafe or rub the cable length 16 excessively after withdrawal. Further, the locking arm 33 and the locking notch 34 may be coated with a suitable material that reduces friction and wear on the cable length 16. Since the locking arm 33 and the locking notch 34 do not actually clamp the cable length 16 this does not reduce the effectiveness of the locking device 30.

It will thus be seen that the invention provides a new and improved locking device for locking or clamping a length of cable after the desired length of cable has been withdrawn from its coil. Persons skilled in the art will appreciate that modifications may be made. For example, the locking piece 30 and particularly the locking arm 33 may extend in the opposite direction to lock a cable which is unwound in the opposite direction. Or, a locking piece with locking arms extending in both directions may be provided. Different pivoting arrangements, different angles of rotation, different biasing arrangements, different release arrangements, and different stop arrangements may be used. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A device for stopping the withdrawal of a coiled flexible member from the interior thereof, comprising:
   (a) a core mounted on said device and positioned within interior of said coiled flexible member;
   (b) an elbow shaped stop arm;
   (c) means pivotally fastening said stop arm to the end of said core past which said flexible member is withdrawn, said stop arm being dimensioned so that when in a first position said flexible member can be withdrawn without obstruction, and so that when in a second position said stop arm engages and causes said flexible member to be withdrawn along said core and wind itself about said core until its withdrawal is stopped by friction between said flexible member and said core; and
   (d) means fastened to said stop arm for causing said stop arm to move from said first position to said second position.

2. For use with a cable wound in a generally cylindrical form, a device for locking said cable withdrawn from the interior of said form comprising:
   (a) a core adapted to be positioned in said interior of said form;
   (b) a locking piece comprising a pivot portion and a locking arm extending from said pivot portion at an angle to form a locking notch;
   (c) means pivotally fastening said pivot portion to an end of said core;
   (d) a bias spring fastened to said end of said core and to said locking piece for pivoting said locking piece to a locking position in which said locking arm and said locking notch are outside the periphery of said core along which said cable passes when withdrawn for causing said withdrawn cable to pass along said locking notch between said locking arm and said core and to frictionally wrap itself about said core;
   (e) and releasable means for holding said locking piece in a permissive position in which said locking arm and said locking notch are inside the periphery of said core along which said cable passes when withdrawn.

3. The locking device of claim 2 wherein said core has a generally circular cross section.

4. The locking device of claim 3 and further comprising a stop post mounted on said core end for determining said locking position of said locking piece.

5. The locking device of claim 4 wherein said bias spring is wound at least partially about said pivotal fastening means.

References Cited
UNITED STATES PATENTS

| | | | |
|---|---|---|---|
| 1,804,996 | 5/1931 | MacDonald | 242—128 |
| 1,936,227 | 11/1933 | Cook | 242—128 XR |
| 3,035,285 | 5/1962 | Squires | 114—206 XR |

MILTON BUCHLER, *Primary Examiner.*

G. E. A. HALVOSA, *Assistant Examiner.*